Dec. 9, 1930. P. FERRIER 1,784,344
JOINT FOR MOLDS OPERATING BY CENTRIFUGAL FORCE
Filed Sept. 21, 1928
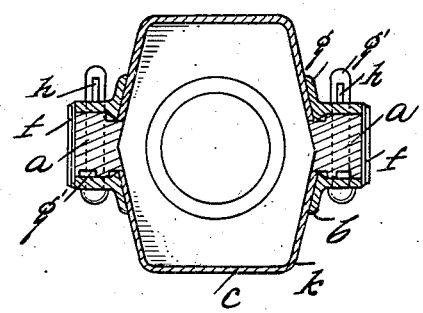
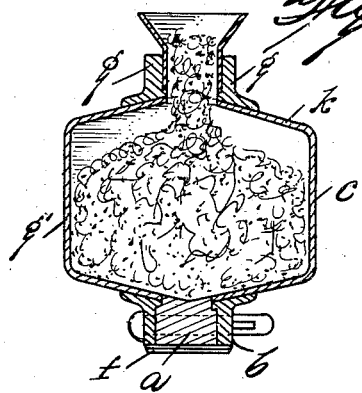
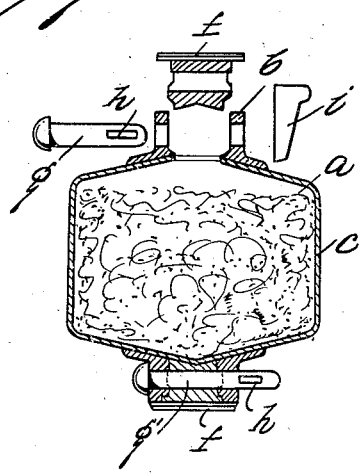
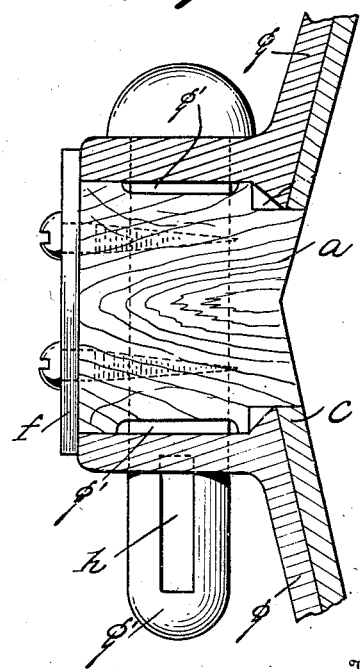
Inventor
PAUL FERRIER Patented Dec. 9, 1930

1,784,344

UNITED STATES PATENT OFFICE

PAUL FERRIER, OF PARIS, FRANCE

JOINT FOR MOLDS OPERATING BY CENTRIFUGAL FORCE

Application filed September 21, 1928, Serial No. 307,466, and in France March 24, 1928.

This invention is directed to a mold designed more particularly for the molding of plastic material by centrifugal force, and contemplates more specifically a means for closing the mold sections, more especially where a long, narrow mold is employed.

In such cases, the material cannot be introduced and distributed over the length of the mold from one end. Since the mold must be opened in two halves for the removal of the object, it becomes difficult to employ the material in an amount which exceeds one half the total contents, for otherwise, inasmuch as the said material is in a very soft state, before the centrifugal treatment, it will sink down, overflow and clog up the joint when the mold is closed. This makes it necessary to give the joint a constant, long and difficult cleaning when it is to be closed, thus increasing the labor and causing prejudicial delays when employing plastic material which hardens rapidly, either by cooling, by hydration or the like.

Further, a joint which is clogged up with material will be difficult to close. Under the action of the centrifugal force, the substance which has remained in the joint will escape, thus leaving an opening through which the internal substance will escape, and the object thus loses a part of its material. This often takes place at the part adjacent the joint, so that the object may be partially or even wholly cut in two.

The present invention relates to an arrangement for such joints by which this twofold defect will be obviated, and by its use the mold can be filled to any desired extent while affording a joint which is a perfectly clean and which can be readily made tight.

Therefore, one object of the invention is to provide a means of forming a joint in molds for plastic material so that a perfect closure is made.

A further object is to form a joint so that the ordinary necessity for cleaning is obviated, thereby saving much time and labor.

A still further object is to form a joint which may be used with centrifugal molds and which will prevent the plastic material from being forced into the crevices of the joint.

A still further object is to provide a joint that is itself a closure for an opening in the mold.

The invention is illustrated in the accompanying drawing, in which:—

Figure 1 is a horizontal section of the mold.

Figure 2 is a horizontal section showing the filling funnel in position.

Figure 3 is a similar view with closure about to be inserted.

Figure 4 is a detail view of the joint.

Referring to Figures 1, 2 and 3, the mold is formed with sheet iron facing $c$ in two sections $j$ and $k$ which have secured to the sheet iron at their meeting edges angle bars $g$. The angle bars $g$ have holes $l$, which on opposing bars align themselves to receive a pin $g'$.

A joint piece $a$, which is here shown as a wood block having its inner face shaped to conform to the mold, is secured between the two sections and between the angle bars. It is formed with a transverse opening which aligns itself with the openings in the angles which the face of the block is flush with the inner surface of the mold. A pin $g'$ having a slot $h$ is adapted to be passed through the bore thus formed, and a wedging block $i$ is driven into the projecting slot, thereby securely hold the joint piece in place. To further assist in strengthening and positioning the block, an iron plate $f$ is secured to the rear or outer face of said block and projecting over the edges of the block forms an abutment plate which prevents the face of the block from extending into the mold.

The form of the said joint is such that it can be employed with all forms of the piece.

The form of the said piece is such that when one edge of the mold is closed with its joint, the other will be open to a somewhat greater degree than the thickness of the joint, so that the latter may be finally inserted without difficulty.

In these conditions, the mold is closed on one side and is placed on edge, so that the other joint will be at the top. If this has been given a sufficient thickness, the material can be introduced through this part.

The place of the joint may be readily and carefully cleaned and the joint piece can be readily put in place, it then being suitably fastened by bolts, keys or the like traversing the joint or placed at the exterior.

Due to its construction, the said joint is well adapted for the jointing of members which are to be permanently disposed in the concrete or of members which are to be removed before the complete hardening, in order to form holes, for example.

I claim:—

1. In a centrifugal molding apparatus, a mold divided into two sections, angle bars secured at the meeting edges of the mold, joint pieces, and means for securing said pieces between the sections.

2. In a centrifugal molding apparatus, a mold divided into two sections, angle bars secured at the meeting edges of the sections, said bars having holes in their projecting side, joint pieces having a bore therein secured between the angle pieces, the inner face of the joint pieces coming flush with the inner surface of the mold, and means preventing the joint pieces from projecting into the mold.

3. In a centrifugal molding apparatus, a mold divided into two sections, angle bars secured at the meeting edges of the sections, said bars having holes in their projecting side, joint pieces having a bore therein secured between the angle pieces, the inner face of the joint pieces coming flush with the inner surface of the mold, a plate secured to the outer edge of each joint abutting the angle bars and preventing said joint pieces from projecting into the mold, and means for securing said joint pieces in position.

In testimony whereof I affix my signature.

PAUL FERRIER.